(12) United States Patent
Meyyappan et al.

(10) Patent No.: US 10,816,411 B1
(45) Date of Patent: Oct. 27, 2020

(54) TEMPERATURE SENSING WITHIN INTEGRATED MICROHEATER

(71) Applicant: UNITED STATES OF AMERICA AS REPRESENTED BY THE ADMINISTRATOR OF NASA, Washington, DC (US)

(72) Inventors: Meyya Meyyappan, San Jose, CA (US); Jin-Woo Han, San Jose, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 343 days.

(21) Appl. No.: 15/697,322

(22) Filed: Sep. 6, 2017

Related U.S. Application Data

(60) Provisional application No. 62/526,850, filed on Jun. 29, 2017.

(51) Int. Cl.
| | | |
|---|---|---|
| *G01K 7/00* | (2006.01) | |
| *G01N 25/18* | (2006.01) | |
| *G01K 7/18* | (2006.01) | |
| *H05B 3/02* | (2006.01) | |

(52) U.S. Cl.
CPC ............. *G01K 7/183* (2013.01); *G01K 7/186* (2013.01); *H05B 3/02* (2013.01)

(58) Field of Classification Search
USPC .................................. 374/141, 183, 44, 170
See application file for complete search history.

(56) References Cited

U.S. PATENT DOCUMENTS

| | | | |
|---|---|---|---|
| 6,232,150 B1* | 5/2001 | Lin | ..................... B81C 1/00269 |
| | | | 438/119 |
| 2004/0062468 A1* | 4/2004 | Lee | ................... B01L 3/502715 |
| | | | 385/14 |

(Continued)

OTHER PUBLICATIONS

Y. Mo, Y. Okawa, M. Tajima, T. Nakai, N. Yoshiike, and K. Natukawa, "Micro-machined gas sensor array based on metal film micro-heater," Sens. Actuator B, Chem., vol. 79, Nos. 2-3, pp. 175-181, Oct. 2001.

(Continued)

*Primary Examiner* — Mirellys Jagan
(74) *Attorney, Agent, or Firm* — Rhys W. Cheung; Robert M. Padilla

(57) ABSTRACT

A microheater performs a self measurement of its own temperature. The microheater has an electrically resistive element which generates heat when a voltage has been applied across the resistive element. The resistive element has an electrical conductivity that is a function of its temperature. A measurement device is positioned within the microheater body and is configured to measure conductivity of the resistive element. An electronic processor, that may be incorporated into the microheater, controls brief interruption of the heating voltage and application of a lower voltage for measuring conductivity. The lower voltage is insufficient to increase the heat output of the microheater, and is applied for too short of a period to allow excessive cooling of the microheater. A microprocessor receives and processes the data obtained from measuring conductivity.

11 Claims, 3 Drawing Sheets

(56) References Cited

U.S. PATENT DOCUMENTS

| | | | | |
|---|---|---|---|---|
| 2006/0131501 A1* | 6/2006 | Ikushima | ............ | G01J 5/02 250/338.1 |
| 2008/0083744 A1* | 4/2008 | Ruiz | ............ | H05B 3/265 219/541 |
| 2013/0140649 A1* | 6/2013 | Rogers | ............ | H01L 31/08 257/414 |

OTHER PUBLICATIONS

Q. Zhou, A. Sussman, J. Chang, J. Dong, A. Zettl, and W. Mickelson, "Fast response integrated MEMS microheaters for ultra low power gas detection," Sens. Actuator A, Phys., vol. 223, pp. 67-75, Mar. 2015.

K. J. Albert et al., "Cross-reactive chemical sensor arrays," Chem. Rev., vol. 100, No. 7, pp. 2595-2626, Jun. 2000.

J.-W. Han, T. Rim, C. K. Baek, and M. Meyyappan, "Chemical gated field effect transistor by hybrid integration of one-dimensional silicon nanowire and two-dimensional tin oxide thin film for low power gas sensor," ACS Appl. Mater. Interface, vol. 7, No. 38, pp. 21263-21269, Sep. 2015.

T. Neda, K. Nakamura, and T. Takumi, "A polysilicon flow sensor for gas flow meters," Sens. Actuator A, Phys., vol. 54, Nos. 1-3, pp. 626-631, Jun. 1996.

N.-T. Nguyen et al., "Thermally mediated droplet forma- tion in microchannels," Appl. Phys. Lett., vol. 91, No. 8, pp. 084102-1-084102-3, Aug. 2007.

T.-D. Luong, N.-T. Nguyen, and A. Sposito, "Thermocoalescence of microdroplets in a microfluidic chamber," Appl. Phys. Lett., vol. 100, No. 25, pp. 254105-1-254105-3, Jun. 2012.

J. Wu, W. Cao, W. Wen, D. C. Chang, and P. Sheng, "Polydimethylsiloxane microfluidic chip with integrated microheater and thermal sensor," Biomicrofluidics, vol. 3, No. 1, pp. 012005-1-012005-8, Mar. 2009.

L. Spassov, D. Y. Yankov, V. Georgiev, F Yossifov, and L. Vergov, "A thermosensitive quartz resonator with a built-in microheater as a multipurpose sensor," Rev. Sci. Instrum., vol. 66, No. 1, pp. 168-170, Jan. 1995.

N. Abedinov, P. Grabiec, T. Gotszalk, T. Ivanov, J. Voigt, and I. W. Rangelow, "Micromachined piezoresistive cantilever array with integrated resistive microheater for calorimetry and mass detection," J. Vac. Sci. Technol. A, vol. 19, No. 6, pp. 2884-2888, Nov. 2001.

T. Yokosawa, T. Alan, G. Pandraud, B. Dam, and H. Zandbergen, "In-situ TEM on (de)hydrogenation of Pd at 0.5-4.5 bar hydrogen pres- sure and 20-400° C," Ultramicroscopy, vol. 112, pp. 47-52, Jan. 2012.

V. Milanovi'c et al., "Micromachined convective accelerometers in standard integrated circuits technology," Appl. Phys. Lett., vol. 76, No. 4, pp. 508-510, Jan. 2010.

S. Santra, P. K. Guha, S. Z. Ali, I. Haneef, and F. Udrea, "Silicon on insulator diode temperature sensor—A detailed analysis for ultra-high temperature operation," IEEE Sensors J., vol. 10, No. 5, pp. 997-1003, May 2010.

R. Podor, J. Pailhon, J. Ravaux, and H.-P. Brau, "Development of an integrated thermocouple for the accurate sample temperature measurement during high temperature environmental scanning electron microscopy (HT-ESEM) experiments," Microscopy Microanal., vol. 21, No. 2, pp. 307-312, Apr. 2015.

M. Afridi, C. Montgomery, E. Cooper-Balis, S. Semancik, K. G. Kreider, and J. Geist, "Microhotplate temperature sensor calibration and BIST," J. Res. Nat. Inst. Standards Technol., vol. 116, No. 6, pp. 827-838, 2011.

\* cited by examiner

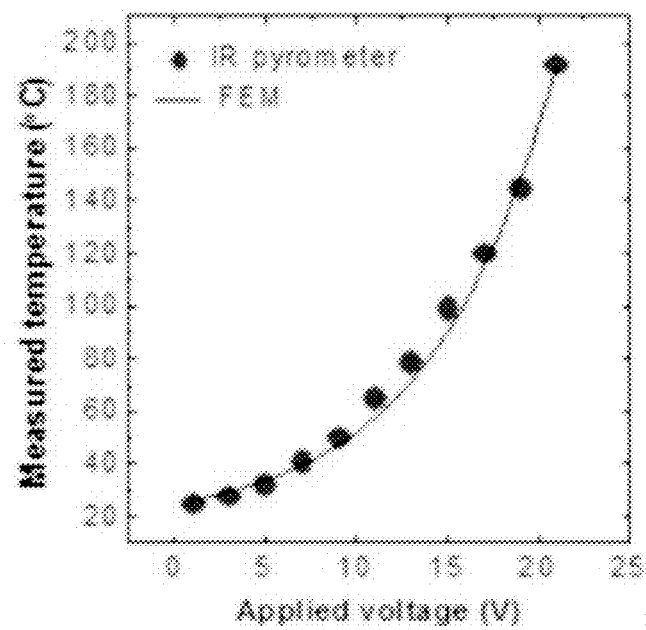
FIG. 3A
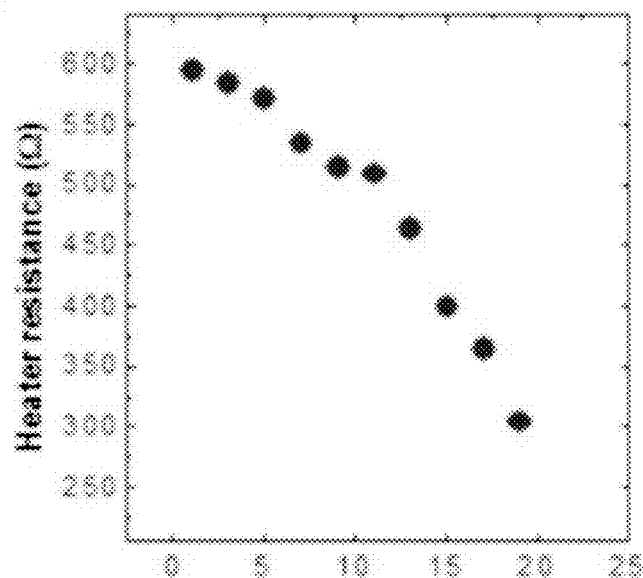
FIG. 3B
FIG. 4
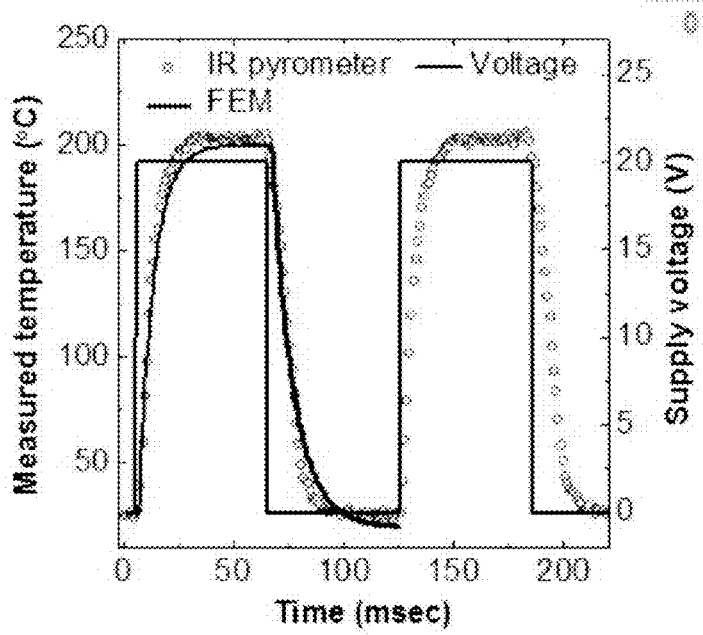

TEMPERATURE SENSING WITHIN INTEGRATED MICROHEATER

CROSS REFERENCE TO RELATED APPLICATION

This application claims the benefit of U.S. Provisional Application No. 62/526,850, entitled "Built-In Temperature Sensing Method in a Microheater," filed on Jun. 29, 2017. U.S. Provisional Application No. 62/526,850 is hereby incorporated herein by reference in their entirety.

ORIGIN OF INVENTION

The invention described herein was made in the performance of work under a NASA contract and by (an) employee(s) of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor has elected not to retain title.

BACKGROUND OF THE DISCLOSURE

Technical Field of the Disclosure

The present invention relates to determining a temperature of a microheater, and more particularly to sensing temperature of a microheater using inherent characteristics of the microheater without relying on a separate sensor.

Description of the Prior Art

Chip-based microheaters are used in many applications, including gas sensors, flow meters, mass sensors, and polymerase chain reaction chambers, where accurate monitoring of temperature is critical. The temperature measurement is carried out using a discrete temperature sensor.

For example, heating the oxide thin film in chemical sensors offers benefits such as acceleration of the response and recovery times, enhanced sensitivity and temperature dependent specificity and selectivity [1]-[4]. Monolithic integration of microheater based devices in sensor arrays can be used as a platform for an electronic nose [3], [4]. In air flow sensors based on a microelectromechanical system, the temperature sensor on the microheater is used to detect the flow rate and direction of the gas [5]. In temperature driven microfluidic channels, the microheater plays a critical role to manipulate the movement of a fluid, which is applicable to the lab-on-a-chip systems used in healthcare applications [6], [7]. In a chip based polymerese chain reactions (PCR), the reaction process requires three different periodically arranged heating zones created by microheaters [8].

Thermosensitive resonator and piezoresistive cantilever with integrated microheater are used as a heat source for calorimetry and mass sensors [9], [10]. A hot stage transmission electron microscope allows in-situ heating for monitoring of phase change or growth mechanism of materials [11]. As seen above, the microheater is an important element in a variety of applications, especially in sensor systems. The microheater consists of three elements: a heater, a temperature sensor, and a controller. The controller is a CMOS circuit to adjust the heater temperate in a programmed manner. A serpentine shaped resistor based Joule heater is common as the heating element. Various sensor structures, which are separate from the microheater, may be mounted adjacent to the microheater and are used for monitoring the temperature.

A thermistor is a type of resistor featuring temperature dependent resistance, and is made using a polysilicon or platinum bar [12]. A thermodiode is a p-n junction where the forward biased current is dependent on the temperature [13]. A thermocouple uses two dissimilar conductors contacted together creating a junction and produces a voltage due to the thermoelectric effect when the temperatures on the two sides are different [14].

SUMMARY OF THE DISCLOSURE

In an embodiment of the disclosure, a microheater comprises a body; an electrically resistive element configured for generating heat exterior to the microheater upon application of a first voltage across the resistive element, the resistive element having an electrical conductivity that is a function of a temperature of the resistive element; a measurement device positioned within the microheater body and configured to measure conductivity of the resistive element; an electronic processor positioned within the microheater body; the processor connected to the resistive element and operative to interrupt application of the first voltage, and to apply a second voltage across the resistive element; the second voltage less than the first voltage; the second voltage used by the measurement device to measure conductivity of the resistive element; the second voltage applied for a predetermined period selected to be sufficient for the measurement device to obtain the conductivity measurement and insufficient for the resistive element to cool more than a predetermined amount; and the processor connected to the measurement device to receive data from the measurement device corresponding to a measured conductivity of the resistive element.

In variations thereof, the measurement device and the second voltage are operative to not heat the microheater device more than 1 degrees C. when measuring conductivity of the resistive element; the second voltage is 10 times less than the first voltage; the predetermined time period during which the second voltage is applied and the conductivity measured is less than 1 msec; the second voltage is 1 V or less; and/or the second voltage is between 0.1 V and 0.5 V.

In further variations thereof, the predetermined time period during which the second voltage is applied and the conductivity measured is selected to be shorter than a time period during which the resistive element will cool more than 1 degree C.; the processor has a clock speed of at least 10 Mhz; the device further including a mode switch configured to alternately connect the first and second voltage, the mode switch controlled by a microprocessor; the mode switch controlling microprocessor is the same as the electronic processor; the microprocessor includes circuits for measuring conductivity, controlling the first voltage, and controlling the second voltage; and/or the microprocessor further including a memory for storing conductance measurement data.

In another embodiment of the disclosure, determining a temperature of a microheater heating element comprises using an electronic processor positioned within a body of the microheater to: control alternate application of a first and a second voltage across a heat producing resistive element of the microheater, the first voltage greater than the second voltage; the second voltage used by a measurement device positioned within the body of the microheater to measure conductivity of the resistive element; the processor configured to apply the second voltage for a predetermined period selected to be sufficient for the measurement device to obtain the conductivity measurement and insufficient for the resistive element to cool more than a predetermined amount.

In variations thereof, the conductivity measurement is correlated to temperature using measurements from a pyrometer; the second voltage is at least 10 times less than the first voltage; the second voltage is applied for less than 1 msec; and/or the second voltage is insufficient to increase a temperature of the resistive element once the resistive element has been heated to a predetermined high temperature by application of the first voltage by the processor.

In a further embodiment of the disclosure, a microheater comprises a body; an electrically resistive element configured for generating heat exterior to the microheater upon application of a first voltage across the resistive element, the resistive element having an electrical conductivity that is a function of a temperature of the resistive element; a measurement device positioned within the microheater body and configured to measure conductivity of the resistive element; and an electronic processor: positioned within the microheater body; the processor connected to the resistive element and operative to interrupt application of the first voltage for less than 1 msec during which time the processor applies a second voltage across the resistive element and conductivity is measured; the second voltage being less than the first voltage; the second voltage used by the measurement device to measure conductivity of the resistive element; the microheater heat output not cooling by more than 0.1% while the first voltage is interrupted, and not increasing in heat output while the second voltage is applied; the processor connected to the measurement device to receive data from the measurement device corresponding to a measured conductivity of the resistive element.

In variations thereof, the measurement device forms a part of the electronic processor; and/or the second voltage is between 0.1 V and 0.5 V.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3A illustrates peak microheater temperature as a function of power supply voltage, where the equilibrium temperature was measured using a calibrated infrared imaging system;

FIG. 3B illustrates microheater resistance due to Joule heating for various power supply voltages;

FIG. 4 illustrates current and cooling transient characteristics, the test conditions including the microheater and ambient temperatures of 200° C. and 25° C., respectively, and where the voltage step was from 20 V to 0.1 V;

DETAILED DESCRIPTION OF THE DISCLOSURE

Figure 1A:
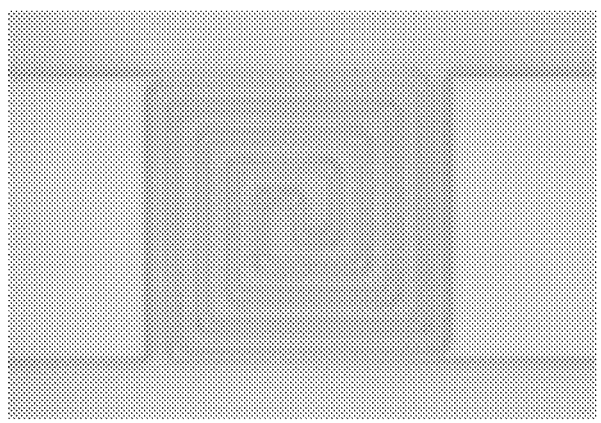
FIG. 1A is an image of a fabricated double spiral type microheater of the disclosure.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The figures herein are drawn for ease of understanding, and are not drawn to scale or proportion.

The disclosure provides a built-in temperature sensing system for microheaters. The resistor-based microheater relies on a Joule heating mechanism and its resistance is dependent upon its own body temperature. In accordance with the disclosure, intermittent temperature sampling is carried out during the heating cycle, while not disturbing the microheater body temperature by setting the temperature sampling voltage and pulse width to be sufficiently low and short, respectively, to avoid a significant perturbation in heating temperature. The achievement of the foregoing is attributed at least in part to the electrical time constant being few orders of magnitude smaller than the thermal time constant. The temperature estimation results using the built-in method of the disclosure show excellent agreement with benchmark measurements using an infrared pyrometer.

Regardless of the nature of the discrete temperature sensor of the prior art, they are placed in the proximity of the heater. Hence, they cannot be used to monitor the body temperature of the heater without additional calibration to compensate for error caused by the proximity effects. This is particularly challenging if a heat loss exists across the microheater center and the sensor. In addition, a sensor fabricated separately from the microheater obviously adds extra processing and resultant cost. Accordingly, the disclosure provides a sensing method that avoids the need for a separate or discrete embedded sensor.

The physical structures of both the Joule heater and the thermistor are equivalent in principle, each having an integral resistor. The inventors realized the resistor can be used to provide the dual function of heating and temperature sensing without one significantly affecting the other. The disclosure accomplishes this by ensuring that the parasitic power used during the temperature sensing operation does not cause heating or cooling of the system to a point where the change in temperature is detrimental to the system functioning as needed.

More particularly, when a voltage is applied across a resistor, its ohmic power translates into heat by H≈(V 2/R)·t, where H is the amount of heat, V is the voltage, R is the resistance, and t is the time. Accordingly, self-heating may be negligible at sufficiently low voltages with a short pulse duration. Second, the interrupt period for the temperature sampling is carried out to be sufficiently short so as to avoid a detrimental temperature perturbation. In accordance with the disclosure, if the electrical time constant is a few orders of magnitude smaller than the thermal time constant, the resistance measurement can be performed before a detrimental temperature drop of the heater occurs. By satisfying these two criteria, the intermittent temperature sampling pulse within the heating period is possible in the microheater component itself, without a requirement for a separate temperature sensor.

The inventors have prepared a temperature sensing mechanism using a fabricated device and have also validated its observed function by theoretical model and finite element method (FEM) simulation. More particularly, and with reference to FIG. 1A, one possible embodiment of a method of fabrication is shown, in which a device of the disclosure is fabricated on a silicon wafer. A 4 inch (100) p-type silicon wafer was used as the starting material. A 100 nm thick silicon dioxide film was thermally grown in a furnace on the bare wafer by wet oxidation at 980° C. for 15 min. A layer thickness thinner than 20 nm was found to be sufficient as an electrical isolation layer in this embodiment, although the thickness for other embodiments can be substantially greater or less depending on factors which would be understood by one skilled in the art. However, a relatively thick silicon oxide as a thermal isolation layer was grown for this device in order to minimize the heat conduction loss through the silicon substrate.

For the heating element, a 200 nm thick in-situ p-type polysilicon film (poly-1) was deposited using low pressure chemical vapor deposition (LPCVD) at 620° C., and was doped with $POCl_3$ on a silicon dioxide grown wafer. The polysilicon film was then patterned to be a double spiral resistor pattern. Both ends of the polysilicon lines were fanned out for the contact formation. The size of the double spiral resistor was 190×190 $\mu m^2$, with a line width of 10 am. Approximately 2 µm thick photoresist was patterned on the contact area. The negative type photoresist was used to form an undercut for a subsequent aluminum lift-off process. RF magnetron sputtering of Al was carried out at room temperature under argon, with a base pressure of 10-6 Torr. The contact metal was made using the photoresist lift-off process.

Figure 1B:
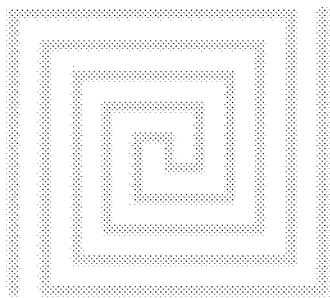
FIG. 1B is a model structure of the microheater of FIG. 1A, used in finite element method simulation.

FIG. 1B shows the FEM simulation structure to calibrate the devices. The simulation parameters were chosen to fit the electrical characteristics of the fabricated device shown in FIG. 1A-1B. The simulation was done using a Finite Element Analysis (FEA) package in COMSOL Multiphysics. Two dimensional (2D) modeling may be considered adequate, as the thickness of the resistor film (200 nm) is three orders of magnitude smaller than the span of the resistor (200 µm). However, the heat distribution in the 2D design is not appropriate because the heat dissipation occurs through three dimensional convectional loss and the resultant power consumption is very large. Therefore, three dimensional (3D) modeling was used in this work. The time dependent heat transfer model is $Q=\rho c_p(dT/dt)-k\nabla^2 T$, where Q is the heat source ($W/m^3$), ρ is the density ($Kg/m^3$), $c_p$ is the specific heat (J/KgK), T is the temperature (K), t is the time (s), k is the thermal conductivity (W/Km) and $\nabla^2$ is the Laplace operator.

It should be understood that the disclosure can be carried out with a wide variety of microheater designs, and that the foregoing is only one possible example device. The actual device structure selected will vary depending on the application. The geometry of the microheater may be but not limited to double spiral, honeycomb, fan shape, meander, S-shape, or plane plate with central square hole. The material of the microheater may be fabricated using, as non-limiting examples, polysilicon, tungsten, titanium, tantalum, copper, titanium nitride, or tantalum nitride. The design and material choice do not limit application of the disclosed mechanism of temperature sensing within an integrated microheater, or the application domain.

As current density is also related to the change in temperature of the material as a function of location and time, the Joule heating source is $Q=J^2/\sigma$, where σ is the electrical conductivity (S/m=1/Ωm) and J is the current density ($A/m^2$). Constant values for thermal conductivity and heat capacity were used here due to a homogeneous material. Despite the appearance of a rectilinear geometrical feature at every corner of the spiral pattern, a uniform current density was assumed as the cross section area of the resistor line is uniform. The thermal conductivities of the polysilicon and the silicon dioxide are 53.75 W/mK and 1.58 W/mK, respectively.

Over the range of the temperatures considered here, the electrical conductivity is a function of the temperature $\sigma=\sigma_0/[1+\alpha(T-T_0)]$, where $T_0$ is a reference temperature and $\sigma_0$ is the conductivity at the reference temperature, and α is a temperature coefficient. When a voltage is applied across the two electrodes, the Joule heating changes the temperature, and the change in temperature also affects the electrical conductivity; thus the electrical and thermal aspects are coupled. The temperature distribution was obtained by solving the coupled models above with an assumed initial temperature of 300 K.

Figure 2A:
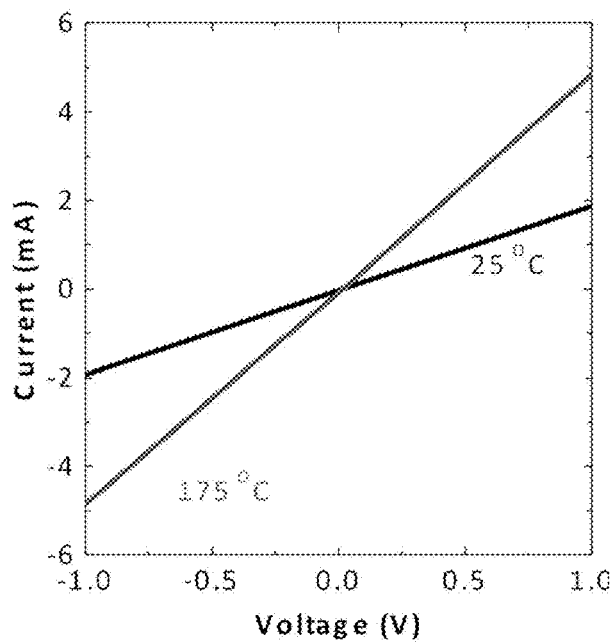
FIG. 2A illustrates current-voltage characteristics of the microheater of FIG. 1A, measured at room and high temperatures.
Figure 2B:
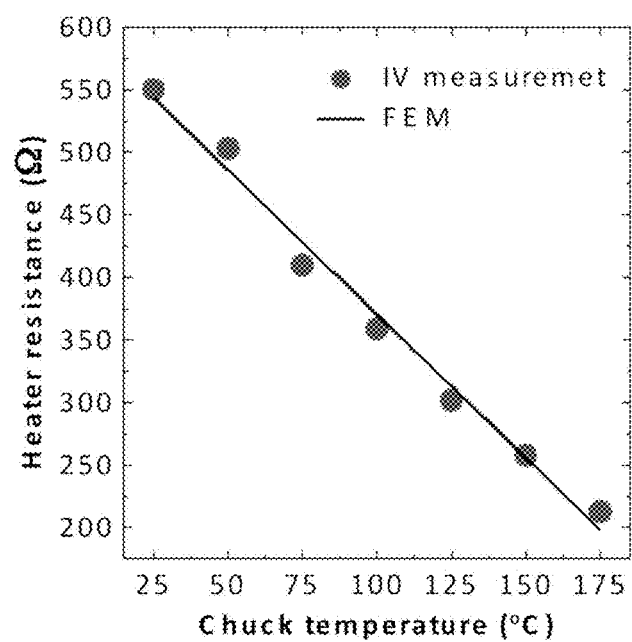
FIG. 2B illustrates measured resistance of the microheater as a function of ambient temperature, where the ambient temperature is adjusted by the hot chuck of the probe station, and the temperature dependent resistance demonstrates that the device has an inherent sensing mechanism of its own body temperature.

FIG. 2A shows the measured current-voltage (I-V) characteristics for the samples under a temperature-controlled chuck. The plot shows a linear behavior at a fixed temperature where the slope changes for different external temperatures. The linear behavior signifies that the aluminum and the polysilicon form an Ohmic contact due to the heavy doping concentration. The reference resistance measured at 25° C. is 550Ω. FIG. 2B shows the resistance extracted from the slope of the I-V curve at 0 V for various chuck temperatures and the resistance shows a negative temperature coefficient (NTC). The resistance—temperature (R-T) relationship is linear and can be written as $R(T)=R(T_0)\cdot(1+\alpha(T-T_0))$. The measurement data was fitted using least square error method to obtain the temperature coefficient, which results in a regression line of $R(T)=647-2.37\cdot T$. This temperature dependent resistance characteristic indicates that the microheater is inherently capable of providing information of its own body temperature, which is discovered and exploited by the instant disclosure.

Clarification is needed first to determine that the sensing function does not disturb the heat balance of the device. There are two possible disturbances, including self-heating and interrupt-cooling. Self-heating may occur when a current passes through the device to monitor the temperature. Thus, the disclosure conducts sensing at very low voltages lasting very short durations for negligible energy supply. For example, in a typical embodiment, the sensing voltage may be carried out with a voltage not exceeding 1 V such as 0.1V or 0.5V and the sensing duration may be less than 1 msec. When the body temperature is much higher than the ambient temperature, the temperature sampling may adversely cool down the microheater as it interrupts the heating function. Thus, the sampling should be carried out as quickly as needed to avoid disturbing the body temperature of the device beyond a limited that would be detrimental to the application, or that would be tolerated by a particular application.

The mode switch between sensing and heating can be modulated by a microcontroller, which can be integral to, or separate from the microheater. Alternatively, when advantageous to a particular application, the microcontroller and the microheater can be integrated in a single package such as system-in-package. For example, a microcontroller made by CMOS technology includes any or all of a first circuit block to measure conductance of the microheater, a second circuit block can be used to supply power to heat up the microheater, and a third circuit block can be provided for alternating the first conductance measurement unit and the heating power supply unit, and a first non-volatile memory block to store conductance and/or temperature data, including calibration data relating to conductance and/or temperature.

To ensure the above conditions, it is important to estimate the electrical time constant and thermal time constant, where the time constant is a form of time delay between the input and output. The electrical time constant is dependent on the relationship between the voltage (input) and current (output) while the thermal time constant depends on the relationship between the power (input) and temperature (output). The electrical time constant ($\tau_e$) is modeled by the resistance (R) and the capacitance (C) of the equivalent circuit, which is often referenced as the RC time constant, $\tau_e$=RC. It is the time required to charge or discharge the capacitance through the resistance. The resistance is characterized by the physical structure of the integrated device, while the capacitance is determined by the area of its neighboring conductor structures and the permittivity of the dielectric in between. In the microheater, the capacitor circuit is formed between the substrate and the resistor body. The measured resistance can vary from 100Ω to 550Ω for the temperature range from the ambient to 200° C. Unlike the resistance, the capacitance is insensitive to the temperature. The capacitance here was smaller than the measurable limit of an ordinary capacitance meter, and the estimated capacitance was approximately 20 fF. Therefore, the electrical time constant would be 2-11 ps.

The thermal time constant ($\tau_t$) is modeled by $\tau_t=\rho c_p V_s/hA_s$, where $\rho$ is the density, $c_p$ is the specific heat, $A_s$ and $V_s$ are the surface area and volume of the heater structure respectively, and h is the heat transfer coefficient. The definition of $\tau_t$ translates into the following scenarios: larger mass and heat capacitance lead to slower temperature change while larger surface area and higher heat transfer coefficient lead to faster temperature change. The polysilicon parameters and structures used in this study result in $\tau_t$=17 msec. There may be some discrepancy in real and estimated values of $\tau_t$ due to the imperfection in model parameters such as the specific heat of the body and the heat transfer coefficient. Nevertheless, the theoretical model estimates that the thermal time constant is six orders of magnitude higher than the electrical time constant, meaning that the temperature transient is significantly slower than the electrical transient. This fact is a hypothesis for why the disclosed built-in temperature sensing method is technically viable and reliable, although the disclosure can be carried out without regard to any particular theory of operation.

FIG. 3A shows the equilibrium temperature measured using an infra-red (IR) imaging system. The IR pyrometer used here was calibrated with the hot-chuck temperature. As a practical matter, the temperature across the fabricated microheater is not believed to be uniform due to a greater convective heat loss along the periphery than at the center, as shown in FIG. 3B. Therefore, the temperature data measured at the very center of the device was chosen to represent the microheater.

The temperature increases as applied voltage is increased and the temperature can reach about 200° C. at 20 V. The body resistance of the microheater at various Joule-heated states are measured and shown in FIG. 3B. As expected, the body resistance is not constant but varies with the heating voltage and the resultant temperature. The equilibrium temperature at an applied voltage less than 1.0 V results in a temperature increase less than 0.3° C. The temperature change is found to be negligible for voltages lower than 0.1 V. The power converted from the electrical energy to thermal energy, $P=V^2/R$, demonstrates that the power decreases quadratically with the voltage. For example, if the voltage is dropped from 10 V for heating to 0.1 V for sampling, the power would be dropped by $10^4$. Therefore, the temperature dependent resistance sampling conducted at 0.1 V can cause negligible self-heating. At the equilibrium state, the energy conversion efficiency is 36%.

Adversely, the sampling can cool the microheater down due to convective heat loss when the ambient temperature is relatively lower than the microheater temperature. It is important to understand how fast the microheater cools down in order to decide upon an allowable interruption time. FIG. 4 shows the cooling transient characteristics due to termination of the power supply. From the calculated RC delay, the current responsiveness is assumed to be spontaneous when it is subject to a step change in voltage. On the other hand, the temperature response is relatively slow compared to the current response. The cooling rate is dependent on the difference between the body temperature (T) and the surrounding ambient temperature (Ta). The temperature difference at a given time, $\Delta T(t)=T-T_a$, is given by $\Delta T(t)=\Delta T(0)\cdot\exp(-t/\tau^t)$. This relation suggests that $\tau_t$ is a dominant factor to decide the transient rate, but a higher initial temperature difference $\Delta T(0)$ can also lead to faster cooling. Thus, a hot microheater and a cold ambient environment can result in a quick temperature drop. Based on the model, the time required to drop 1° C. is about 85 μsec at $\Delta T(0)$=200° C. and $\tau_t$=17 msec. The measured cooling transient time is approximately 11 msec. The transient time was extracted from the time that drops 63.2% of the difference between the initial and final temperature. As expected from the model, the slope of the temperature transient is steep at the initial stage, implying that the high initial body temperature is susceptible to the interruption. The time to drop 1° C. from 200° C. was measured to be approximately 80 jasec. This is interpreted to mean that the temperature sampling less than a few microsecond would be free of temperature perturbation. In a modern circuit, the voltage pulse can be easily made to be in the order of few nsec. As an example, if the temperature sampling is made with a 100 nsec pulse, the temperature perturbation from 200° C. is 0.002° C.

Figure 5A:
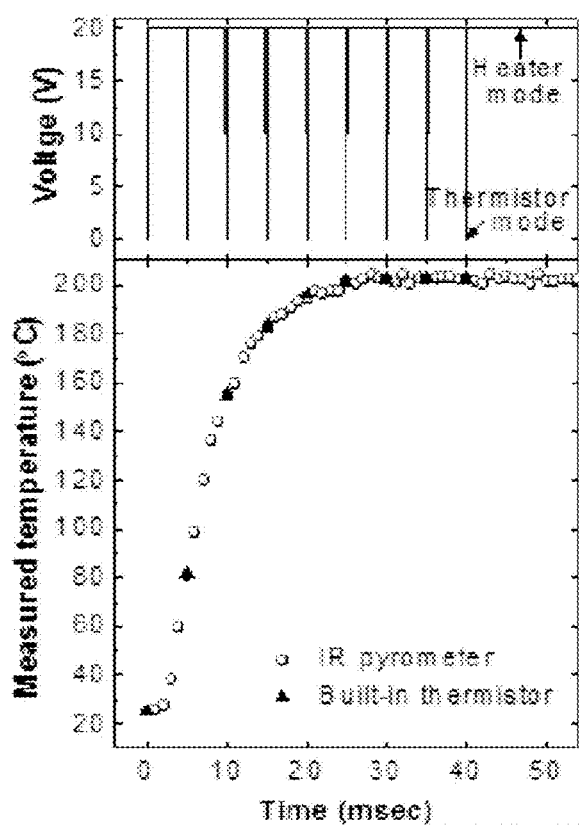
FIGS. 5A and 5B illustrate comparison of transient characteristics between measurement and the present built-in model for (5A) heating and (5B) cooling, where the peak temperature recorded by an IR detector and the present built-in sensing method show close correlation.
Figure 5B:
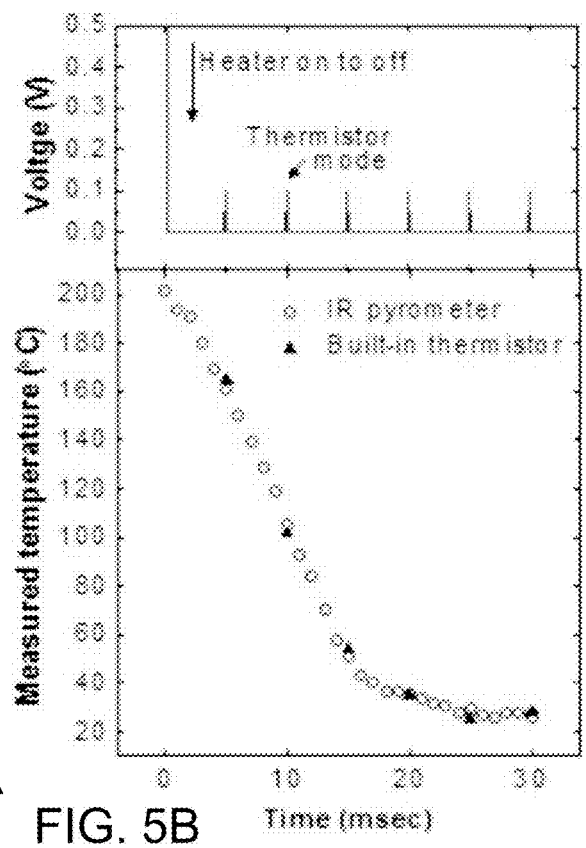

The transient temperature characteristic measured by an IR pyrometer is compared with that estimated by the present built-in thermistor method, as shown in FIG. 5. Constant 20 V and 0 V are applied for heating and cooling, respectively. During the heating or cooling, the temperature sampling voltage of 0.1 V and pulse width of 100 nsec were applied for every 5 msec. The temperature estimated from the built-in model shows results consistent with the direct optical measurement method.

Figure 6A:
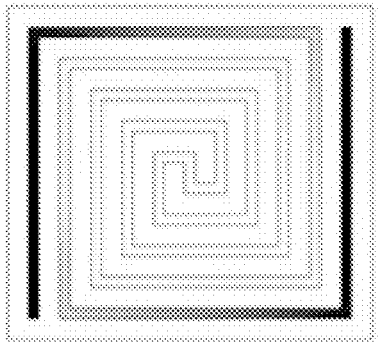
FIGS. 6A and 6B illustrate FEM simulation results during (6A) heating and (6B) temperature sampling periods at 200° C. equilibrium state.
Figure 6B:
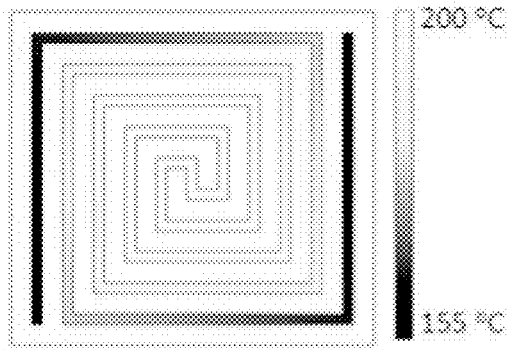

Though the overall temperature does not change significantly during the sampling period, the behavior of a local temperature gradient within the heating elements is of interest. The temperature map for the heating state and sampling state is compared in FIG. 6 in order to examine the local temperature perturbation during the sampling period. The plots show almost identical temperature profiles and gradients, which signifies that the long phonon time constant does not disturb the local temperature. The short interruption due to the temperature sampling is found not to perturb its own body temperature, as defined herein. These results confirm that the microheater can function as a heater as well as a temperature sensor, at the same time, as a practical matter.

Figure 7:
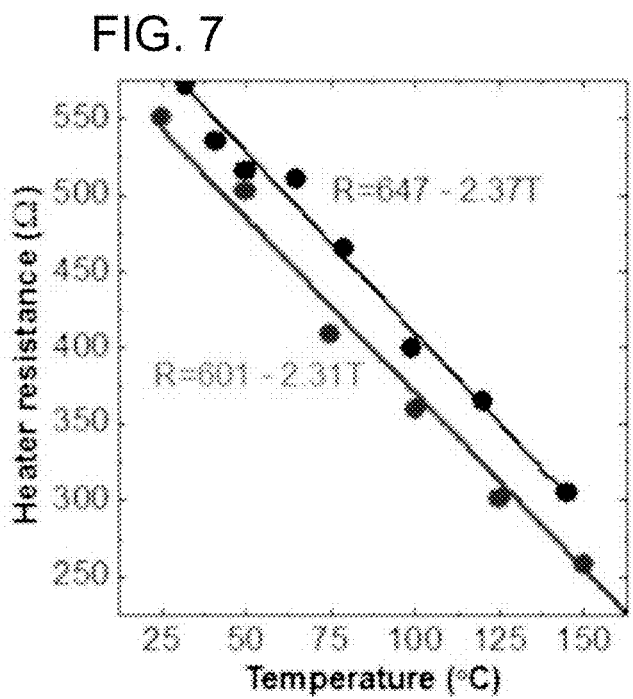
FIG. 7. illustrates measured resistance of the microheater as a function of externally controlled heat source (lighter lower points and line) and internal Joule heating (darker upper points and line), where the small discrepancy is due to the fact that the hot chuck results in homogeneous heating while Joule heating leads to higher convection loss along the periphery of the sample.

The temperature used to derive the built-in temperature sensing model was calibrated using the IR pyrometer data. In some cases, however, an IR pyrometer may not be readily available while the hot chuck may be available. Unfortunately, the calibration by using the known hot chuck (external heating element) temperature may result in a misleading model. To clarify, the resistance versus the temperature characteristics are re-drawn with the data from FIG. 2B and FIGS. 3A and 3B yield the resistance originated internally by the Joule heating of the microheater, while FIG. 2B shows the resistance due to the external heat source. FIG. 7 shows that the hot chuck results in a lower resistance than the Joule heating. The hot chuck should heat up homogeneously for the entire region, while the Joule heating leads to convective heat loss along the periphery of the sample. Therefore, the temperature can be underestimated if the sensing mechanism is modeled using the hot chuck. In this case, some error correction scheme would be necessary. Interestingly, a parallel shift is seen in the calibration curves due to the similar temperature coefficients. This implies that the temperature modeled using hot chuck can be compensated by simply adding approximately 45° C.

In the test embodiment above, measurement is estimated not to produce more than 0.001 degrees C. of heating of the test device, and does not result in any cooling. However, in accordance with the disclosure, a significant amount of cooling or heating is an amount sufficient to interfere with use of the integrated heater device, which varies based on the application. For most applications, noted elsewhere herein, measurement producing a temperature change of the heater of 0.01 degree C. is significant. For other applications, 0.001 degree C. is significant. The disclosure is capable of producing a theoretically minimum temperature change of 0.001 degrees C. or less, although fabrication can be carried out to achieve an extent of temperature change no greater than is needed, in order to reduce costs. More particularly, an extent of temperature change during sensing is based upon the time required to obtain the read result, which is a function of processing speed, which is a function of cost.

Similarly, in the test embodiment above, measurement is estimated not to produce more than 1% variance between sensed and actual temperature. However, in accordance with the disclosure, a significant variance is an amount sufficient to interfere with calculations for subsequent use of the integrated heater device, which varies based on the application. For most applications, noted elsewhere herein, a sensed measurement of more than 0.1% is significant. For other applications, 0.001% is significant. The disclosure is capable of producing a theoretically minimum temperature variance of 0.0001% or less, although fabrication can be carried out to achieve an extent of temperature change no greater than is needed, in order to reduce costs. More particularly, as above, accuracy is based upon the time required to obtain the read result, which is a function of processing speed, which is a function of cost.

Thus, the disclosure provides a cost effective temperature sensing method harnessing attributes which are inherent to the microheater, which thereby eliminates the need for discrete embedded sensors. Intermittent interruption for the temperature sampling is found to be allowable during the heating period as long as the sampling is made at very low voltages lasting short durations. The electrical time constant of the order of tens of picoseconds is nine orders of magnitude smaller than the thermal time constant in the order of tens of milliseconds. In addition, a clock frequency of 10 MHz that is easily affordable at low cost electronics can sample pulses of 100 nanoseconds. This results in temperature sampling within six orders magnitude faster than the time required to drop 1° C. Therefore, the present method enables self body temperature sensing of a microheater, at low cost with negligible self-heating and interrupt-cooling effects.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

REFERENCES

[1] Y. Mo, Y. Okawa, M. Tajima, T. Nakai, N. Yoshiike, and K. Natukawa, "Micro-machined gas sensor array based on metal film micro-heater," *Sens. Actuator B, Chem.*, vol. 79, nos. 2-3, pp. 175-181, October 2001.

[2] Q. Zhou, A. Sussman, J. Chang, J. Dong, A. Zettl, and W. Mickelson, "Fast response integrated MEMS microheaters for ultra low power gas detection," *Sens. Actuator A, Phys.*, vol. 223, pp. 67-75, March 2015.

[3] K. J. Albert et al., "Cross-reactive chemical sensor arrays," *Chem. Rev.*, vol. 100, no. 7, pp. 2595-2626, June 2000.

[4] J.-W. Han, T. Rim, C. K. Baek, and M. Meyyappan, "Chemical gated field effect transistor by hybrid integration of one-dimensional silicon nanowire and two-dimensional tin oxide thin film for low power gas sensor," *ACS Appl. Mater. Interface*, vol. 7, no. 38, pp. 21263-21269, September 2015.
[5] T. Neda, K. Nakamura, and T. Takumi, "A polysilicon flow sensor for gas flow meters," *Sens. Actuator A, Phys.*, vol. 54, nos. 1-3, pp. 626-631, June 1996.
[6] N.-T. Nguyen et al., "Thermally mediated droplet formation in microchannels," *Appl. Phys. Lett.*, vol. 91, no. 8, pp. 084102-1-084102-3, August 2007.
[7] T.-D. Luong, N.-T. Nguyen, and A. Sposito, "Thermocoalescence of microdroplets in a microfluidic chamber," *Appl. Phys. Lett.*, vol. 100, no. 25, pp. 254105-1-254105-3, June 2012.
[8] J. Wu, W. Cao, W. Wen, D. C. Chang, and P. Sheng, "Polydimethylsilox-ane microfluidic chip with integrated microheater and thermal sensor," *Biomicrofluidics*, vol. 3, no. 1, pp. 012005-1-012005-8, March 2009.
[9] L. Spassov, D. Y. Yankov, V. Georgiev, E. Yossifov, and L. Vergov, "A thermosensitive quartz resonator with a built-in microheater as a multipurpose sensor," *Rev. Sci. Instrum.*, vol. 66, no. 1, pp. 168-170, January 1995.
[10] N. Abedinov, P. Grabiec, T. Gotzalk, T. Ivanov, J. Voigt, and I. W. Rangelow, "Micromachined piezoresistive cantilever array with integrated resistive microheater for calorimetry and mass detection," *J. Vac. Sci. Technol. A*, vol. 19, no. 6, pp. 2884-2888, November 2001.
[11] T. Yokosawa, T. Alan, G. Pandraud, B. Dam, and H. Zandbergen, "In-situ TEM on (de)hydrogenation of Pd at 0.5-4.5 bar hydrogen pres-sure and 20-400° C.," *Ultramicroscopy*, vol. 112, pp. 47-52, January 2012.
[12] V. Milanovi´c et al., "Micromachined convective accelerometers in standard integrated circuits technology," *Appl. Phys. Lett.*, vol. 76, no. 4, pp. 508-510, January 2010.
[13] S. Santra, P. K. Guha, S. Z. Ali, I. Haneef, and F. Udrea, "Silicon on insulator diode temperature sensor-A detailed analysis for ultra-high temperature operation," *IEEE Sensors J.*, vol. 10, no. 5, pp. 997-1003, May 2010.
[14] R. Podor, D. Pailhon, J. Ravaux, and H.-P. Brau, "Development of an integrated thermocouple for the accurate sample temperature measurement during high temperature environmental scanning electron microscopy (HT-ESEM) experiments," *Microscopy Microanal.*, vol. 21, no. 2, pp. 307-312, April 2015.

The invention claimed is:

1. A microheater device, comprising:
an electrically resistive element configured for generating heat upon application of a first voltage across the resistive element, the resistive element having an electrical conductivity that is a function of a temperature of the resistive element; and
a microcontroller, the microcontroller comprising:
a first circuit block configured to measure the conductivity of the resistive element using a second voltage applied across the resistive element;
a second circuit block operative to interrupt application of the first voltage, and to apply the second voltage across the resistive element, wherein the second voltage is less than the first voltage, and the second circuit block is configured to apply the second voltage for a predetermined time period selected to be sufficient for the first circuit block to measure the conductivity and insufficient for the resistive element to cool more than a predetermined amount; and
a non-volatile memory block configured to store data received from the first circuit block corresponding to the measured conductivity of the resistive element.

2. The device of claim 1, the second voltage being operative to not heat the microheater device more than 1 degrees C. when measuring the conductivity of the resistive element.

3. The device of claim 1, wherein the second voltage is 10 times less than the first voltage.

4. The device of claim 1, wherein the predetermined time period during which the second voltage is applied and the conductivity measured is less than 1 msec.

5. The device of claim 1, wherein the second voltage is 1 V or less.

6. The device of claim 1, wherein the second voltage is between 0.1 V and 0.5 V.

7. The device of claim 1, wherein the predetermined time period during which the second voltage is applied and the conductivity is measured is selected to be shorter than a time period during which the resistive element will cool more than 1 degree C.

8. The device of claim 1, wherein the microcontroller has a clock speed of at least 10 Mhz.

9. The device of claim 1, the microcontroller further configured to modulate a mode switch to alternately connect a heating power supply unit for the first voltage and a supply for the second voltage.

10. A microheater device, comprising:
an electrically resistive element configured for generating heat upon application of a first voltage across the resistive element, the resistive element having an electrical conductivity that is a function of a temperature of the resistive element; and
a microcontroller, the microcontroller comprising:
a first circuit block configured to measure the conductivity of the resistive element using a second voltage applied across the resistive element; and
a second circuit block operative to interrupt application of the first voltage for less than 1 msec during which time the second voltage is applied across the resistive element and the conductivity is measured by the first circuit block;
wherein the second voltage is less than the first voltage;
the microheater device heat output not cooling by more than 0.1% while the first voltage is interrupted, and not increasing in heat output while the second voltage is applied;
and the microcontroller configured to receive data from the first circuit block corresponding to the measured conductivity of the resistive element.

11. The device of claim 10, wherein the second voltage is between 0.1 V and 0.5 V.

* * * * *